(12) United States Patent
Ganesan et al.

(10) Patent No.: US 9,524,181 B2
(45) Date of Patent: Dec. 20, 2016

(54) VIRTUAL SWITCH AND VIRTUAL SWITCH PORT MANAGEMENT FOR VM AVAILABILITY

(71) Applicant: VMWARE, INC., Palo Alto, CA (US)

(72) Inventors: Hariharan Jeyaraman Ganesan, Bangalore (IN); Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 174 days.

(21) Appl. No.: 14/285,642

(22) Filed: May 23, 2014

(65) Prior Publication Data

US 2015/0293772 A1    Oct. 15, 2015

(30) Foreign Application Priority Data

Apr. 11, 2014   (IN) .............................. 1934/CHE/2014

(51) Int. Cl.
G06F 9/455    (2006.01)
G06F 1/32     (2006.01)

(52) U.S. Cl.
CPC ......... *G06F 9/45558* (2013.01); *G06F 1/3287* (2013.01); *G06F 2009/45595* (2013.01)

(58) Field of Classification Search
CPC .................. G06F 9/45558; G06F 1/3287
See application file for complete search history.

(56) References Cited

U.S. PATENT DOCUMENTS

| | | | | |
|---|---|---|---|---|
| 8,639,783 B1* | 1/2014 | Bakke | .............. | H04L 49/70 709/220 |
| 8,984,621 B2* | 3/2015 | Burch et al. | .............. | 726/15 |
| 2007/0283015 A1* | 12/2007 | Jackson | .............. | H04L 45/02 709/226 |
| 2008/0239946 A1 | 10/2008 | Morita | | |
| 2009/0025007 A1* | 1/2009 | Hara | .............. | G06F 3/0607 718/105 |
| 2009/0150529 A1* | 6/2009 | Tripathi | .............. | G06F 9/455 709/222 |
| 2009/0238072 A1* | 9/2009 | Tripathi | .............. | H04L 47/10 370/235 |
| 2010/0100878 A1* | 4/2010 | Otani | .............. | H04L 67/1097 718/1 |
| 2010/0131636 A1* | 5/2010 | Suri | .............. | H04L 45/00 709/224 |
| 2011/0299413 A1* | 12/2011 | Chatwani | .............. | H04L 12/4625 370/252 |
| 2012/0324442 A1* | 12/2012 | Barde | .............. | H04L 49/70 718/1 |

(Continued)

*Primary Examiner* — Jerry Dennison

(57) ABSTRACT

Techniques for virtual switch and virtual switch port management for VM availability in a cluster are described. In one example embodiment, a determination is made as to whether a virtual switch port on a first virtual switch associated with a first VM network is available for powering on the VM on a first host computing system. Based on the outcome of the determination either further determination is then made as to whether a virtual switch port on a second virtual switch associated with the first VM network is available to power on the VM on a second host computing system or migration of the VM in a power-off state is initiated to the second host computing system and powered-on on the second host computing system via the virtual switch port on the second virtual switch associated with the first VM network associated.

9 Claims, 5 Drawing Sheets

(56) References Cited

U.S. PATENT DOCUMENTS

| | | | |
|---|---|---|---|
| 2013/0034021 A1* | 2/2013 | Jaiswal | H04L 12/4641 370/255 |
| 2013/0046892 A1* | 2/2013 | Otani | G06F 15/173 709/226 |
| 2013/0074066 A1* | 3/2013 | Sanzgiri | H04L 49/70 718/1 |
| 2014/0036675 A1* | 2/2014 | Wang | G06F 9/52 370/235 |
| 2014/0201554 A1* | 7/2014 | Yamazaki | G06F 1/3287 713/324 |
| 2014/0259015 A1* | 9/2014 | Chigusa | G06F 9/45558 718/1 |
| 2015/0277951 A1* | 10/2015 | Sundararaman | G06F 9/45558 718/1 |
| 2015/0293772 A1* | 10/2015 | Ganesan | G06F 9/45558 718/1 |

* cited by examiner

VIRTUAL SWITCH AND VIRTUAL SWITCH PORT MANAGEMENT FOR VM AVAILABILITY

RELATED APPLICATIONS

Benefit is claimed under 35 U.S.C. 119(a)-(d) to Foreign application Serial No. 1934/CHE/2014 filed in India entitled "VIRTUAL SWITCH AND VIRTUAL SWITCH PORT MANAGEMENT FOR VM AVAILABILITY", filed on Apr. 11, 2014, by VMware, Inc., which is herein incorporated in its entirety by reference for all purposes.

BACKGROUND

Virtual networking can network virtual machines (VMs) in a manner analogous to the way physical networking is used to network physical devices. Typical virtual networking components include virtual switches, virtual switch ports, and virtual network interface controllers (vNICs). Virtual switches allow VMs on the same physical host computing system, or across physical host computing systems, to communicate with each other using the same protocols that would be used over physical switches, without the need for additional networking hardware. Multiple virtual switches can be created on a single physical host computing system. Virtual switch ports on a virtual switch provide logical connection points for virtual devices, such as VMs, and between virtual and physical devices. Typically, each virtual switch is capable of having several thousand virtual switch ports.

In most cases, a virtual switch port must be available for a VM to power on. Typically, administers will configure a virtual switch to have enough virtual switch ports to accommodate the maximum anticipated number of VMs. However, this may result in consuming additional resources if a separate process is used for implementing each virtual switch. Further, this can result in a significant number of unused virtual switch ports, which can introduce security threats and expose VMs to external attacks and exploits, such as an intruder gaining unauthorized access, malware, spam and/or phishing.

SUMMARY

One or more embodiments disclosed herein provide a method for virtual switch and virtual switch port management for VM availability in a virtual datacenter. The method includes determining whether a virtual switch port on a first virtual switch associated with a first VM network is available for powering on the VM on a first host computing system. The method further determines whether a virtual switch port on a second virtual switch associated with the first VM network is available to power on the VM on a second host computing system, if the virtual switch port on the first virtual switch associated with the first VM network is not available for powering on the VM on the first host computing system. migration of the VM in a power-off state is then initiated to the second host computing system and powering on the VM on the second host computing system via the virtual switch port on the second virtual switch associated with the first VM network, if the virtual switch port on the second virtual switch associated with the first VM network is available to power on the VM on the second host computing system.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps for virtual switch and virtual switch port management for VM availability in a virtual datacenter. The instructions further include determining whether a virtual switch port on a first virtual switch associated with a first VM network is available for powering on the VM on a first host computing system. The instruction furthermore includes determining whether a virtual switch port on a second virtual switch associated with the first VM network is available to power on the VM on a second host computing system if the virtual switch port on the first virtual switch associated with the first VM network is not available for powering on the VM on the first host computing system. Moreover the instruction initiate migration of the VM in a power-off state to the second host computing system and powering on the VM on the second host computing system via the virtual switch port on the second virtual switch associated with the first VM network, if the virtual switch port on the second virtual switch associated with the first VM network is available to power on the VM on the second host computing system.

Embodiments of the present disclosure provide a computing system. The computing system includes first and second host computing systems in a virtual datacenter. Each of the host computing include multiple virtual switches, Wherein each virtual switch having multiple virtual switch ports and wherein each host computing system hosting multiple VMs via the associated multiple virtual switches and multiple switch ports. The computing system further includes a management network that is communicatively coupled to the first and second host computing systems. In addition, the computing system includes first and second VM networks communicatively coupled to the associated multiple virtual switches residing in the first and second host computing systems for routing network traffic of VMs. Moreover, the computing system includes a management server that is communicatively to the management network, wherein the management server includes a dynamic resource scheduler (DRS), wherein the DRS is configured for virtual switch and virtual switch port management for VM availability in the virtual datacenter.

DETAILED DESCRIPTION

Embodiments described herein provide virtual switch and virtual switch port management for VM availability in a virtual datacenter. The proposed technique enables powering on VMs via cold migration or dynamic virtual port switch configuration even when virtual switch ports are not available to power on VMs in an associated virtual switch. Further, this technique significantly reduces memory utilization for virtual networking. Furthermore, this technique enables improved security by not having free virtual switch ports, i.e., having more virtual switch ports than needed in a virtual network, which can be prone for external attacks.

System Overview and Examples of Operation

Figure 1:
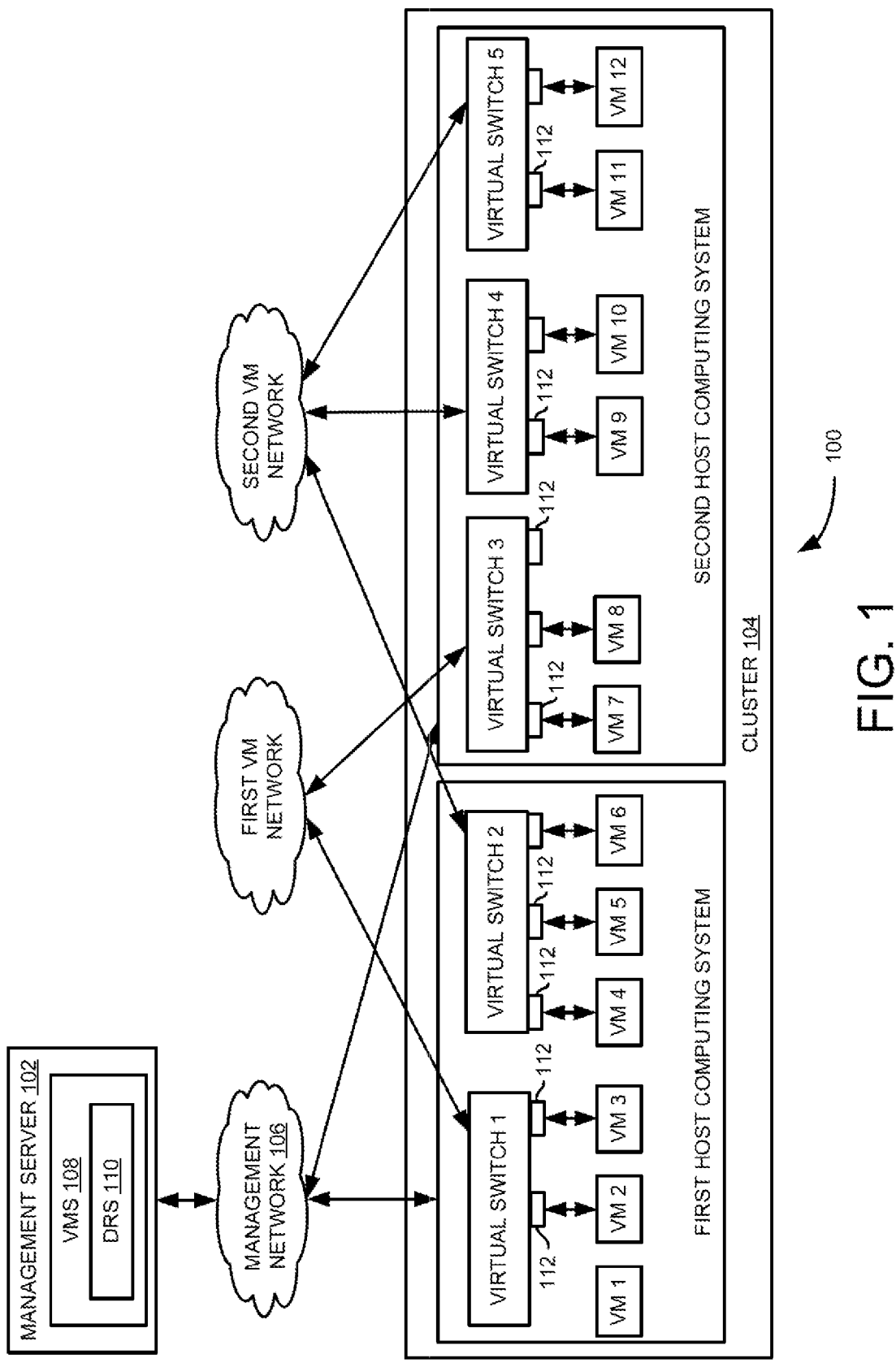
FIGS. 1-3 are block diagrams illustrating a system for virtual switch and virtual switch port management for VM in a virtual datacenter, according to an example embodiment.

FIG. 1 is a block diagram illustrating system 100 for providing virtual switch and virtual switch port management for VM availability in a cluster in a virtual datacenter, according to an example embodiment. As shown in FIG. 1, system 100 includes first and second host computing systems and associated virtual machines (VMs) VM1-12 hosted by first and second host computing systems via associated virtual switches 1-5 and virtual switch ports 112 in a cluster 104. Further as shown in FIG. 1, system 100 includes management server 102 that is communicatively coupled to first and second host computing systems via management network 106. Furthermore as shown in FIG. 1, management server 102 includes dynamic resource scheduler (DRS) 110 residing in virtual management software (VMS) 108. In addition as shown in FIG. 1, first and second host computing systems are communicatively coupled to associated first and second VM networks via associated virtual switches 1-5.

In operation, VMS 108 determines whether a virtual switch port 112 on a first virtual switch associated with a first VM network is available for powering on a VM (VM1 as shown in FIG. 1) on first host computing system. In some embodiments, DRS 110 residing in VMS 108 determines whether a virtual switch port 112 on a first virtual switch associated with a first VM network is available for powering on a VM (VM1 as shown in FIG. 1) on first host computing system.

Based on the outcome of the determination, VMS 108 powers on the VM (VM1 shown in FIG. 1) on first host computing system if the virtual switch port 112 on the first virtual switch associated with the first VM network is available for powering on the VM (VM1 shown in FIG. 1) on the first host computing system. Further based on the outcome of the determination, VMS 108 furthermore determines whether a virtual switch port 112 on a second virtual switch associated with the first VM network is available to power on the VM (VM1 shown in FIG. 1) on a second host computing system if the virtual switch port 112 on the first virtual switch associated with the first VM network is not available for powering on the VM on the first host computing system.

In some embodiments, based on the outcome of the determination, DRS 110 powers on the VM (VM1 shown in FIG. 1) on first host computing system if the virtual switch port 112 on the first virtual switch associated with the first VM network is available for powering on the VM (VM1 shown in FIG. 1) on the first host computing system. Further based on the outcome of the determination, DRS 110 furthermore determines whether a virtual switch port 112 on a second virtual switch associated with the first VM network is available to power on the VM (VM1 shown in FIGS. 1-3) on a second host computing system if the virtual switch port 112 on the first virtual switch associated with the first VM network is not available for powering on the VM on the first host computing system.

Figure 2:
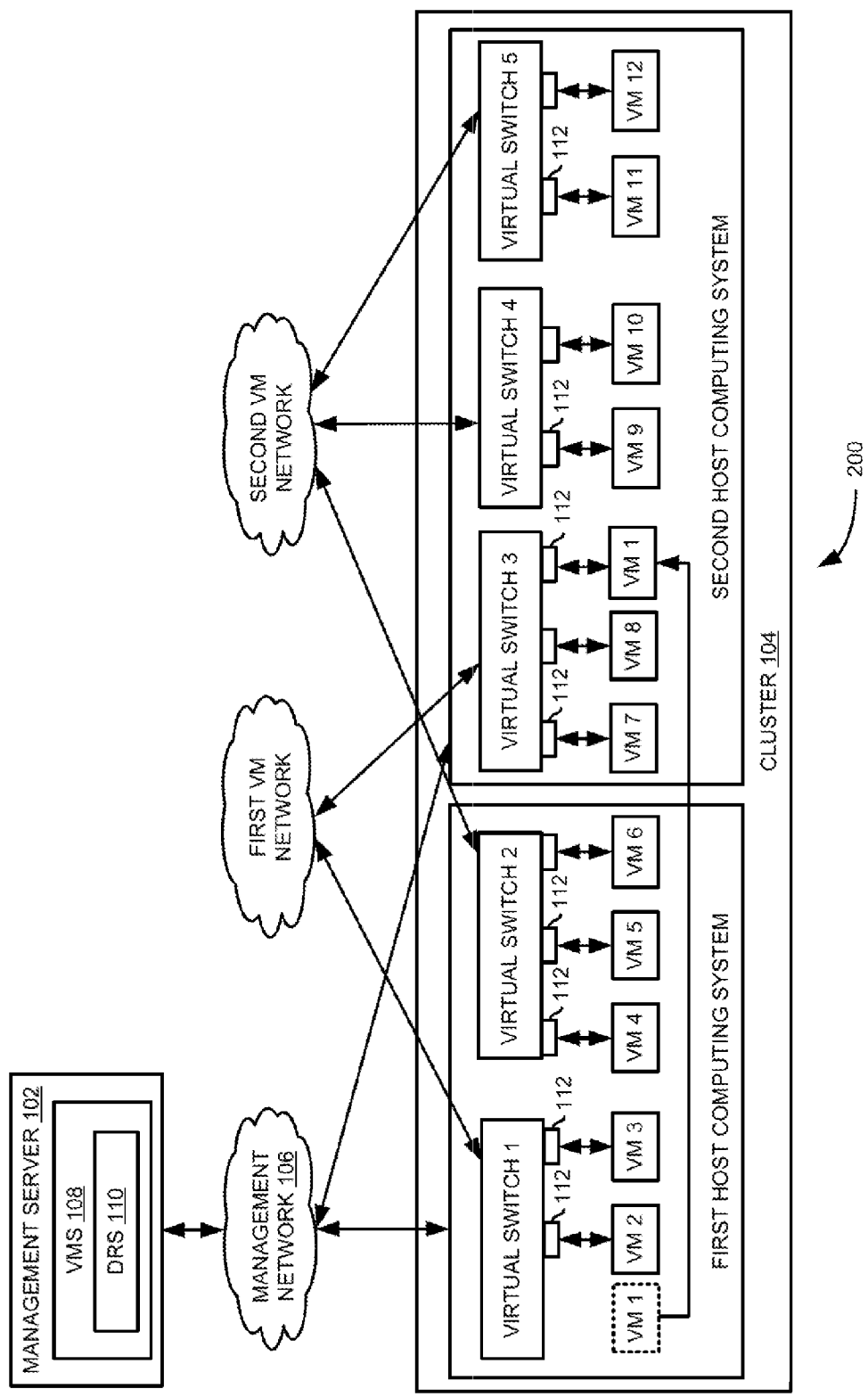

Further in operation, as shown in FIG. 2, based on the outcome of the determination, VMS 108 initiates migration of the VM (VM1 shown in FIG. 2) in a power-off state (also referred to as cold migration) to second host computing system and powers on the VM (VM1 shown in FIG. 2) on second host computing system via virtual switch port 112 on second virtual switch associated with first VM network if the virtual switch port on the second virtual switch associated with the first VM network is available to power on the VM on the second host computing system. One skilled in the art would appreciate that by giving VM migration a priority over creating a virtual switch port may reduce open virtual ports in the network which could help reduce security risks as any open virtual switch port may be used by any malicious software program or process to initiate external attacks, such as malware, span and/or phishing.

In some embodiments, as shown in FIG. 2, based on the outcome of the determination, DRS 110 initiates migration of the VM (VM1 shown in FIG. 2) in a power-off state (also referred to as cold migration) to second host computing system and powers on the VM (VM1 shown in FIG. 2) on second host computing system via virtual switch port 112 on second virtual switch associated with first VM network if the virtual switch port on the second virtual switch associated with the first VM network is available to power on the VM on the second host computing system.

Figure 3:
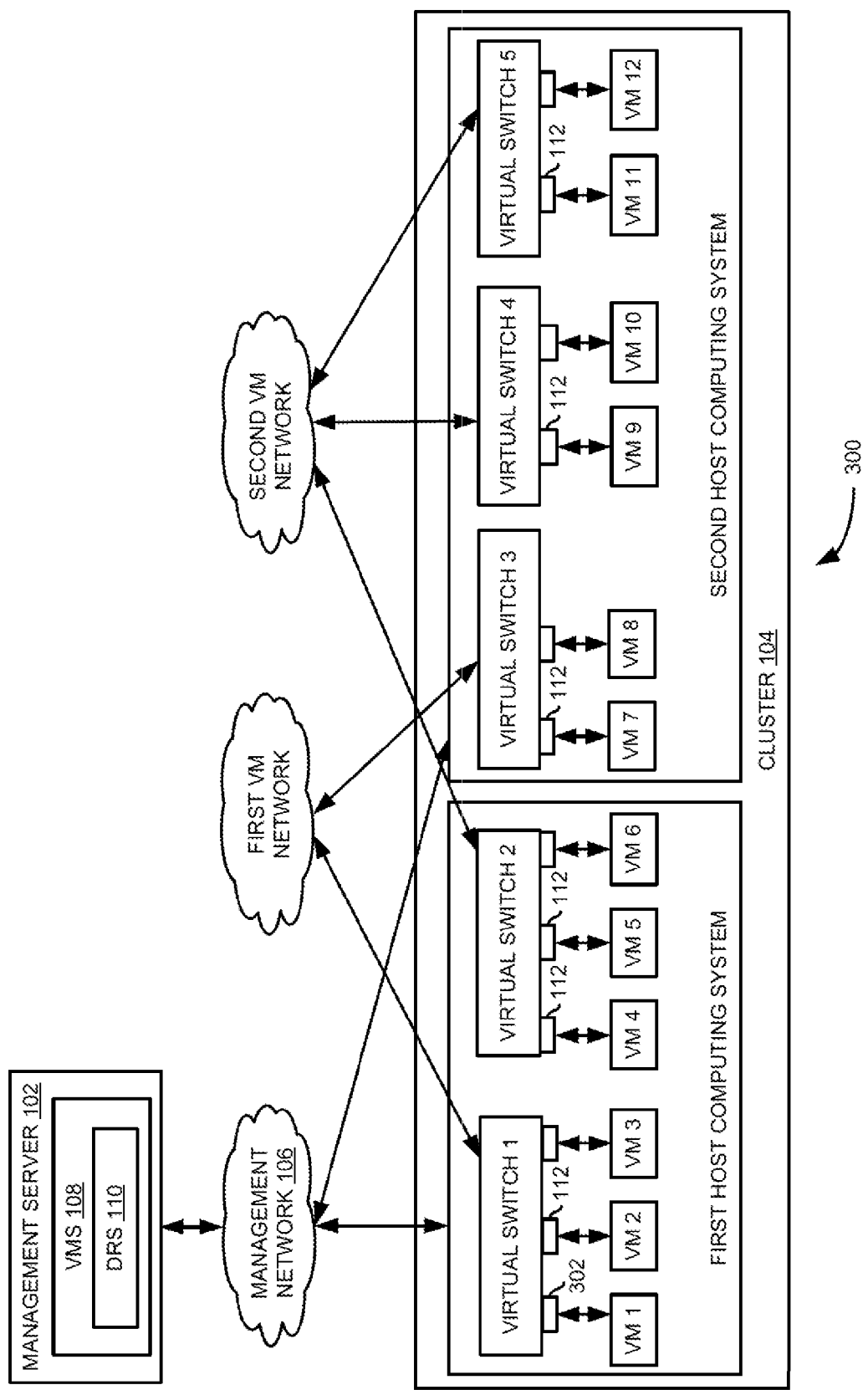

Furthermore in operation, as shown in FIG. 3, VMS 108 instructs first virtual switch associated with first host computing system to dynamically create a virtual switch port 302 associated with first VM network for powering on the VM (VM1 shown in FIGS. 1-3) if the virtual switch port 112 on second virtual switch associated with first VM network is not available to power on the VM (VM1 shown in FIGS. 1-3) on second host computing system.

In some embodiments, as shown in FIG. 3, DRS 110 instructs first virtual switch associated with first host computing system to dynamically create a virtual switch port 302 associated with first VM network for powering on the VM (VM1 shown in FIGS. 1-3) if the virtual switch port 112 on second virtual switch associated with first VM network is not available to power on the VM (VM1 shown in FIGS. 1-3) on second host computing system.

Also, although certain terms are used primarily herein, other terms could be used interchangeably to yield equivalent embodiments and examples. For example, the term "host computing system" may be used interchangeably with "physical host", "physical machine" or "physical device". Further for example, there term "virtual switch port" may be used interchangeably with "virtual port". Furthermore for example, it is well-known that equivalent terms in the field of system virtualization or similar or related fields could be substituted for such terms as "physical computer," "hypervisor," "virtual machine," or the like. Also, the terms "virtual computing environment" and "virtual datacenter" are used interchangeably throughout the document. The terms "network failure", "network connectivity failure", and "lost network connectivity" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4:
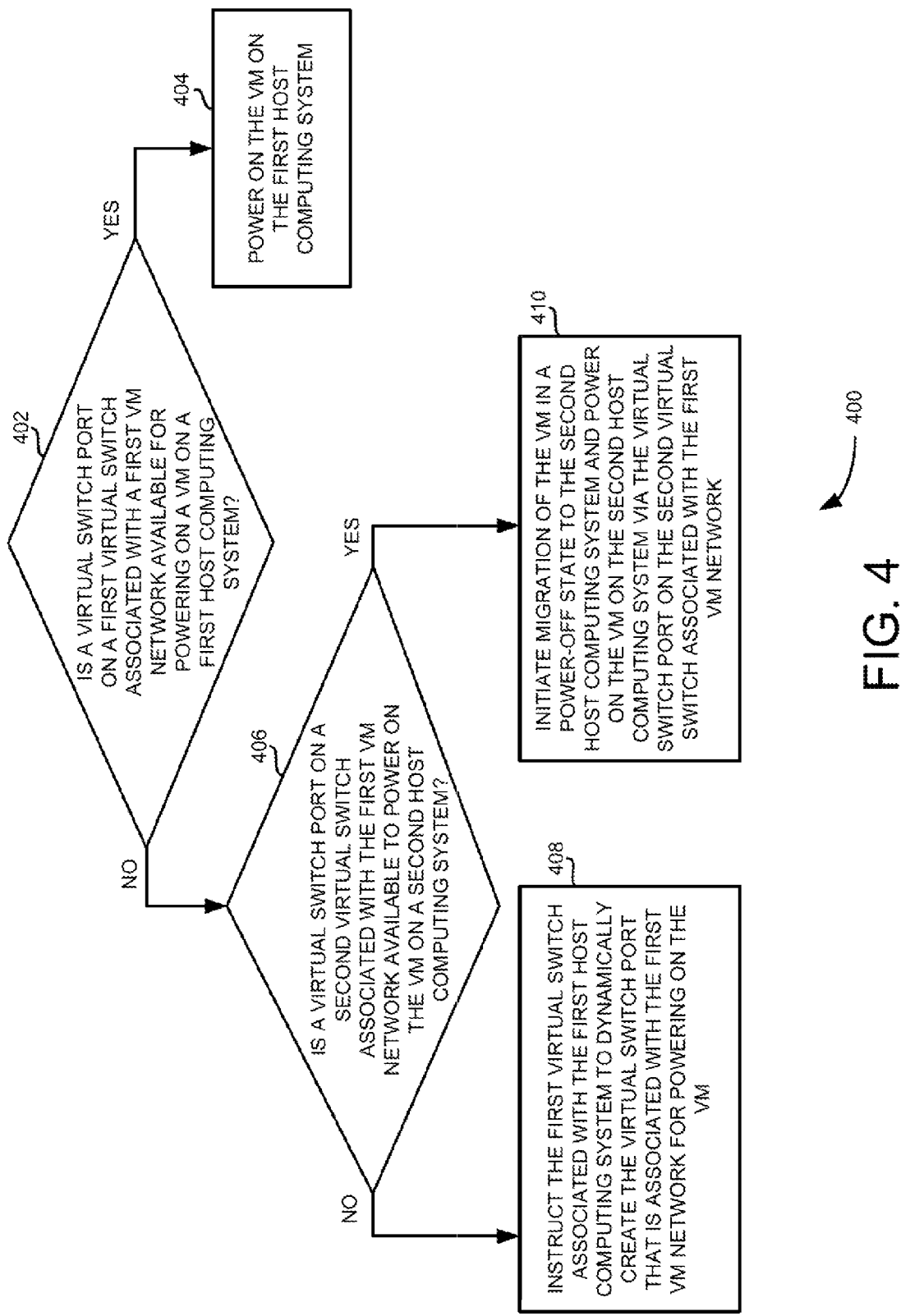
FIG. 4 is a flow diagram of process for virtual switch and virtual switch port management for VM in a virtual datacenter, according to an example embodiment.

FIG. 4 is a flow diagram of process 400, for providing virtual switch and virtual switch port management for VM availability in a virtual datacenter, according to an example embodiment.

At block 402, process 400 determines whether a virtual switch port on a first virtual switch associated with a first VM network is available for powering on the VM on a first host computing system.

At block 404, the process 400 powers on the VM on the first host computing system, if the virtual switch port on the first virtual switch associated with the first VM network is available for powering on the VM on the first host computing system. At 406, the process 400 determines whether a virtual switch port on a second virtual switch associated with the first VM network is available to power on the VM on a second host computing system, if the virtual switch port on the first virtual switch associated with the first VII network is not available for powering on the VM on the first host computing system.

At block 408, the first virtual switch associated with the first host computing system is instructed to dynamically create the virtual switch port that is associated with the first VM network for powering on the VM if the virtual switch port on the second virtual switch associated with the first VM network is not available to power on the VM on the second host computing system. At block 410, migration of the VM in a power-off state is initiated to the second host computing system and powering on the VM on the second host computing system via the virtual switch port on the second virtual switch associated with the first VM network, if the virtual switch port on the second virtual switch associated with the first VM network is available to power on the VM on the second host computing system.

Process 400 for providing virtual switch and virtual switch port management for VM availability in a virtual datacenter is explained in more detail above with reference to the system diagrams 100-300 shown in FIGS. 1-3.

Figure 5:
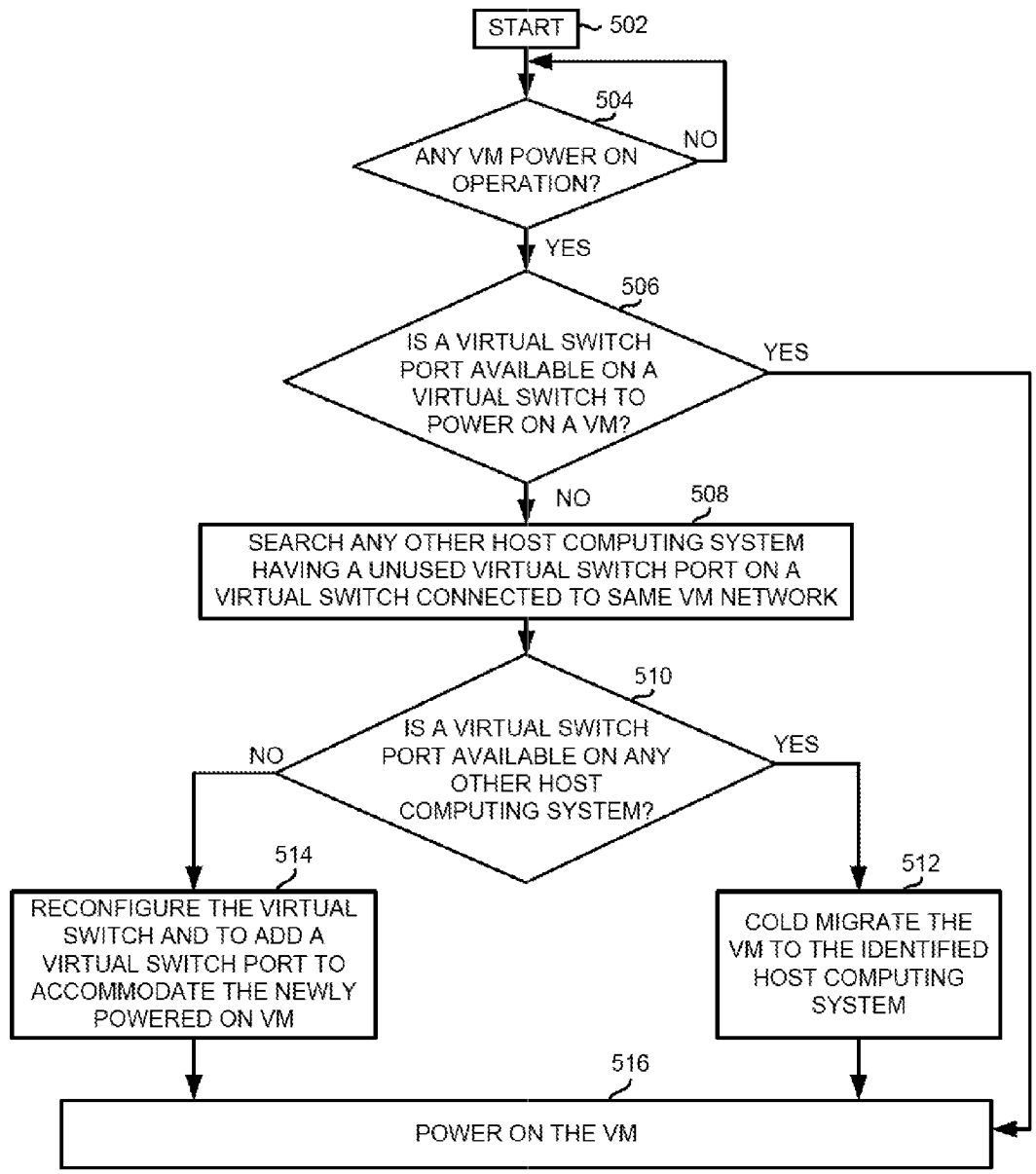
FIG. 5 is another flow diagram of process for virtual switch and virtual switch port management for VM in a virtual datacenter, according to an example embodiment.

FIG. 5 is a flow diagram of another process 500, for providing virtual switch and virtual switch port management for VM availability in a virtual datacenter, according to an example embodiment.

At blocks 502 and 504, process 500 starts with determining whether any VM is being powered on in the virtual datacenter. At block 506, a determination is made as to whether a virtual switch port is available on a virtual switch to power on the VM. If a virtual switch port is available then the process 500 goes to block 516 and powers on the VM using the virtual switch port via associated virtual switch. If the virtual switch port is not available to power on the VM, then process at blocks 508 and 510 initiates a search to determine whether any other host computing system in the virtual datacenter has an unused virtual switch port available that is running on the associated virtual switch connected to the same VM network. At block 514, the virtual switch is reconfigured to add a virtual switch port to accommodate powering on the VM and then goes to block 516 to power on the VM. At block 512, a cold migration is performed to migrate the VM to the identified computing system and then goes to block 516 to power on the VM.

The architecture shown in FIGS. 1-3 may in some embodiments be partially or fully virtualized. For example, systems 100-300 shown in FIGS. 1-3 may be one or possibly many VMs executing on physical hardware and managed by a hypervisor, VM monitor, or similar technology. Also, multiple host computing systems 106 A-N show in FIGS. 1-3 may include virtualization logic to manage multiple VMs.

In an example embodiment, components/modules of DRS are implemented using standard programming techniques. In other embodiments, DRS may be implemented as instructions processed by a VM that executes as one of other programs.

Furthermore, in some embodiments, some or all of the components of DRS may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for migrating VMs across host computing systems based on cache characteristics in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices e.g., desktop computers, wireless handsets, electronic organizers, personal digital assistants, tablet computers, portable email machines, game machines, pagers, navigation devices, etc.).

The invention claimed is:

1. A method for virtual switch and virtual switch port management for virtual machine (VM) availability in a cluster in a virtual datacenter, comprising:
    determining whether a virtual switch port on a first virtual switch associated with a first VM network is available for powering on a VM on a first host computing system;
    if the virtual switch port on the first virtual switch associated with the first VM network is available for powering on the VM on the first host computing system, then powering on the VM on the first host computing system; and
    if the virtual switch port on the first virtual switch associated with the first VM network is not available for powering on the VM on the first host computing system, determining whether a virtual switch port on a second virtual switch associated with the first VM network is available to power on the VM on a second host computing system;
    if the virtual switch port on the second virtual switch associated with the first VM network is available to power on the VM on the second host computing system, initiating migration of the VM in a power-off state to the second host computing system and powering on the VM on the second host computing system via the virtual switch port on the second virtual switch associated with the first VM network; and
    if the virtual switch port on the second virtual switch associated with the first VM network is not available to power on the VM on the second host computing system, instructing the first virtual switch associated with the first host computing system to dynamically create the virtual switch port that is associated with the first VM network for powering on the VM.

2. The method of claim 1, wherein determining whether the virtual switch port on the first virtual switch associated with the first VM network is available for powering on the VM on the first host computing system, comprises:
    determining whether the virtual switch port on the first virtual switch associated with the first VM network is available for powering on the VM on the first host computing system by a dynamic resource scheduler (DRS).

3. The method of claim 2, wherein determining whether the virtual switch port on the second virtual switch associated with the first VM network is available to power on the VM on the second host computing system, comprises:
    determining whether the virtual switch port on the second virtual switch associated with the first VM network is available to power on the VM on the second host computing system by the DRS.

4. A non-transitory computer-readable storage medium including instructions that, when executed in a computing system, to perform virtual switch and virtual switch port management for VM availability in a cluster in a virtual datacenter, the method comprising:
    determining whether a virtual switch port on a first virtual switch associated with a first VM network is available for powering on the VM on a first host computing system;
    if the virtual switch port on the first virtual switch associated with the first VM network is available for powering on the VM on the first host computing system, then powering on the VM on the first host computing system; and
    if the virtual switch port on the first virtual switch associated with the first VM network is not available for powering on the VM on the first host computing system, determining whether a virtual switch port on a second virtual switch associated with the first VM network is available to power on the VM on a second host computing system;
    if the virtual switch port on the second virtual switch associated with the first VM network is available to power on the VM on the second host computing system, initiating migration of the VM in a power-off state to the second host computing system and powering on the VM on the second host computing system via the virtual switch port on the second virtual switch associated with the first VM network; and
    if the virtual switch port on the second virtual switch associated with the first VM network is not available to power on the VM on the second host computing system, instructing the first virtual switch associated with the first host computing system to dynamically create the virtual switch port that is associated with the first VM network for powering on the VM.

5. The non-transitory computer-readable storage medium of claim 4, wherein determining whether the virtual switch port on the first virtual switch associated with the first VM network is available for powering on the VM on the first host computing system, comprises:
    determining whether the virtual switch port on the first virtual switch associated with the first VM network is available for powering on the VM on the first host computing system by a dynamic resource scheduler (DRS).

6. The non-transitory computer-readable storage medium of claim 5, wherein determining whether the virtual switch port on the second virtual switch associated with the first VM network is available to power on the VM on the second host computing system, comprises:
    determining whether the virtual switch port on the second virtual switch associated with the first VM network is available to power on the VM on the second host computing system by the DRS.

7. A computing system for virtual switch and virtual switch port management for VM availability in a cluster in a virtual datacenter, the system comprising:
    first and second host computing systems, wherein each of the first and second host computing systems comprises:
        multiple virtual switches and wherein each virtual switch having multiple virtual switch ports and wherein each host computing system hosting multiple VMs via the associated multiple virtual switches and multiple switch ports;
    a management network communicatively coupled to the first and second host computing systems;
    first and second VM networks communicatively coupled to the associated multiple virtual switches residing in the first and second host computing systems for routing network traffic of VMs; and
    a management server communicatively coupled to the management network, wherein the management server comprising virtual management software (VMS), and wherein the VMS comprising a dynamic resource scheduler (DRS) to:
    determine whether a virtual switch port on a first virtual switch associated with a first VM network is available for powering on the VM on a first host computing system;
        if the virtual switch port on the first virtual switch associated with the first VM network is available for powering on the VM on the first host computing system, then powering on the VM on the first host computing system; and
        if the virtual switch port on the first virtual switch associated with the first VM network is not available for powering on the VM on the first host computing system, determine whether a virtual switch port on a second virtual switch associated with the first VM network is available to power on the VM on a second host computing system;

if the virtual switch port on the second virtual switch associated with the first VM network is available to power on the VM on the second host computing system, initiate migration of the VM in a power-off state to the second host computing system and powering on the VM on the second host computing system via the virtual switch port on the second virtual switch associated with the first VM network; and if the virtual switch port on the second virtual switch associated with the first VM network is not available to power on the VM on the second host computing system, instructing the first virtual switch associated with the first host computing system to dynamically create the virtual switch port that is associated with the first VM network for powering on the VM.

8. The computing system of claim 7, wherein determining whether the virtual switch port on the first virtual switch associated with the first VM network is available for powering on the VM on the first host computing system, comprises:

determining whether the virtual switch port on the first virtual switch associated with the first VM network is available for powering on the VM on the first host computing system by a dynamic resource scheduler (DRS).

9. The computing system of claim 8, wherein determining whether the virtual switch port on the second virtual switch associated with the first VM network is available to power on the VM on the second host computing system, comprises:

determining whether the virtual switch port on the second virtual switch associated with the first VM network is available to power on the VM on the second host computing system by the DRS.

* * * * *